United States Patent
Chang et al.

(10) Patent No.: US 11,556,107 B2
(45) Date of Patent: *Jan. 17, 2023

(54) MACHINING APPARATUS ERROR CORRECTION SYSTEM AND METHOD USING SAFE, CORRECTION AND ALARM INTERVALS

(71) Applicant: HONGFUJIN PRECISION ELECTRONICS (CHENGDU) Co., Ltd., Chengdu (CN)

(72) Inventors: Neng-Wei Chang, New Taipei (TW); Tao Zeng, Chengdu (CN); Hai-Jiu Wan, Chengdu (CN); Yuan-Ji Li, Chengdu (CN); Bing Zhou, Chengdu (CN)

(73) Assignee: HONGFUJIN PRECISION ELECTRONICS (CHENGDU) Co., Ltd., Chengdu (CN)

(*) Notice: Subject to any disclaimer, the term of this patent is extended or adjusted under 35 U.S.C. 154(b) by 207 days.

This patent is subject to a terminal disclaimer.

(21) Appl. No.: 16/729,050

(22) Filed: Dec. 27, 2019

(65) Prior Publication Data

US 2020/0209826 A1 Jul. 2, 2020

(30) Foreign Application Priority Data

Dec. 29, 2018 (CN) .......................... 201811643059.7

(51) Int. Cl.
G05B 19/404 (2006.01)
G05B 19/18 (2006.01)
G05B 19/402 (2006.01)

(52) U.S. Cl.
CPC ......... *G05B 19/402* (2013.01); *G05B 19/404* (2013.01); *G05B 19/18* (2013.01); *G05B 2219/37506* (2013.01)

(58) Field of Classification Search
CPC .... G05B 19/402; G05B 19/404; G05B 19/18; G05B 2219/37506; G05B 19/4063;
(Continued)

(56) References Cited

U.S. PATENT DOCUMENTS 5,117,169 A * 5/1992 Kakino ................ G05B 19/401
318/578
5,740,081 A 4/1998 Suzuki
(Continued)

FOREIGN PATENT DOCUMENTS

CN 1286157 A 3/2001
CN 102914995 A 2/2013
(Continued)

OTHER PUBLICATIONS

Wikipedia, "Interval Arithmetic", wikipedia.com retrieved from the internet on Jan. 3, 2022 URL:<https://en.wikipedia.org/wiki/Interval_arithmetic> (Year: 2022).*

(Continued)

*Primary Examiner* — Kenneth M Lo
*Assistant Examiner* — Jonathan Michael Skrzycki
(74) *Attorney, Agent, or Firm* — ScienBiziP, P.C.

(57) ABSTRACT

A machining apparatus error correction method is implemented in a machining apparatus error correction system. The method includes setting initial operating parameters according to a predetermined machining program, obtaining dimensional detection data during machining of a product, calculating a dimensional correction parameter according to the detection data and a dimensional inspection standard according to a predetermined correction model and generating a correction parameter file readable by the machining apparatus, and distributing the correction parameter file to (Continued)

the corresponding machining apparatus. The initial operating parameters include clamping parameters and dimensional inspection standards.

14 Claims, 12 Drawing Sheets

(58) Field of Classification Search
CPC ........... G05B 2219/32192; G05B 2219/37573; G05B 19/401; Y02P 90/02
See application file for complete search history.

(56) References Cited

U.S. PATENT DOCUMENTS

| | | | |
|---|---|---|---|
| 6,571,145 B1 | 5/2003 | Mawake et al. | |
| 10,955,238 B1* | 3/2021 | Jones | G01B 21/045 |
| 2003/0065419 A1 | 4/2003 | Fujishima et al. | |
| 2004/0049312 A1* | 3/2004 | Bender | B23Q 17/2233 700/175 |
| 2009/0033271 A1 | 2/2009 | Hon et al. | |
| 2011/0009031 A1 | 1/2011 | Honegger et al. | |
| 2014/0067321 A1* | 3/2014 | Zinngrebe | B24B 49/003 702/176 |
| 2016/0327931 A1* | 11/2016 | Gu | G05B 19/402 |
| 2017/0308057 A1* | 10/2017 | Kreidler | G05B 19/41875 |
| 2019/0258224 A1 | 8/2019 | Maeda et al. | |
| 2020/0174442 A1 | 6/2020 | Sun et al. | |

FOREIGN PATENT DOCUMENTS

| | | |
|---|---|---|
| CN | 104423344 A | 3/2015 |
| CN | 104865899 A | 8/2015 |
| CN | 105094052 A | 11/2015 |
| CN | 108594760 A | 9/2018 |
| JP | S61-071946 A | 4/1986 |
| JP | H03-176703 A | 7/1991 |
| JP | H07-040193 A | 2/1995 |
| JP | H07-116945 A | 5/1995 |
| JP | H08-132332 A | 5/1996 |
| JP | 2000-317775 A | 11/2000 |
| JP | 2003-108206 A | 4/2003 |
| JP | 2015-223684 A | 12/2015 |
| JP | 2017-191541 A | 10/2017 |
| WO | 2018030939 A1 | 2/2018 |

OTHER PUBLICATIONS

Application of Dimension Tree in Automatic Modification of Graphic Dimension, Zhejiang Ocean University, Dongyan, pp. 21-23, Jul. 31, 1997.

* cited by examiner

| Dimension determination | Dimension 1 | | Dimension 2 | | Dimension 3 | | Dimension 4 | | Dimension 5 | | Dimension 6 | | Dimension 7 | | Dimension 8 | | Dimension 9 | | Dimension 10 | | Dimension 11 | | Dimension 12 | | |
|---|---|---|---|---|---|---|---|---|---|---|---|---|---|---|---|---|---|---|---|---|---|---|---|---|---|
| | 0.1 | | 0.1 | | 0.1 | | 0.1 | | 0.1 | | 0.1 | | 0.1 | | 0.1 | | 0.1 | | 0.1 | | 0.1 | | 0.1 | | |
| Alarm interval | • | | | | | | | | | | | | | | | | | | | | | | | | 180%~Max% |
| Correction interval | | | | | | | • | | | | | | | | | | | | | | | | 0.05 | | 150%~180% |
| Safety interval | | | | | | | | | | | • | | • | | | | • | | | | | | 0.02 | | 50%~150% |
| Correction interval | | | | | | | | | | | | | | | • | | | | • | | • | | 0 | | 20%~50% |
| Alarm interval | | | | | | | | | | | | | | | | | | | | | | | −0.02 | | |
| | | | | • | | | | | | | | | | | | | | | | | | | −0.05 | | −50%~Min% |
| | −0.1 | | −0.1 | | −0.1 | | −0.1 | | −0.1 | | −0.1 | | −0.1 | | −0.1 | | −0.1 | | −0.1 | | −0.1 | | −0.1 | | |

FIG. 8

| Milling direction | Down milling | | Up milling | |
|---|---|---|---|---|
| Correction direction | −1 | 1 | −1 | 1 |
| Correction value | (+)Expansion | (−)Expansion | (+)Expansion | (−)Expansion |
| | (−)Retraction | (+)Retraction | (−)Retraction | (+)Retraction |
| Determination method | Milling direction*correction direction*correction value<0 means retraction, otherwise expansion | | | |

FIG. 11

MACHINING APPARATUS ERROR CORRECTION SYSTEM AND METHOD USING SAFE, CORRECTION AND ALARM INTERVALS

FIELD

The subject matter herein generally relates to machining apparatus, and more particularly to a machining apparatus error correction system and a machining apparatus error correction method.

BACKGROUND

Generally, production workshops use computer numerical control (CNC) equipment for machining parts into semi-finished or finished products. CNC is a program-controlled automatic machine tool that logically processes control codes or other symbols to perform prescribed actions. In the related art, the CNC equipment is only adjusted manually by a technician when a failure rate of inspection of the product reaches a certain range, or the CNC equipment is manually adjusted by the technician according to a predetermined adjustment schedule. However, technicians are required to perform adjustment operations on the CNC equipment according to an inspection status of the product, which consumes human resources and cannot achieve the realization of an intelligent factory under the current Internet of Things system.

BRIEF DESCRIPTION OF THE DRAWINGS

Implementations of the present disclosure will now be described, by way of embodiments, with reference to the attached figures.

FIG. 8 is a diagram of intervals set according to a tolerance range of a dimensional inspection standard.

FIG. 11 is a diagram showing an abnormality judgment.

DETAILED DESCRIPTION

Figure 1:
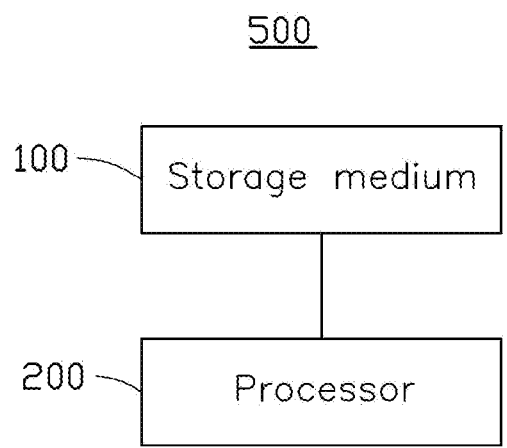
FIG. 1 is a schematic block diagram of an embodiment of a machining apparatus error correction system.
Figure 2:
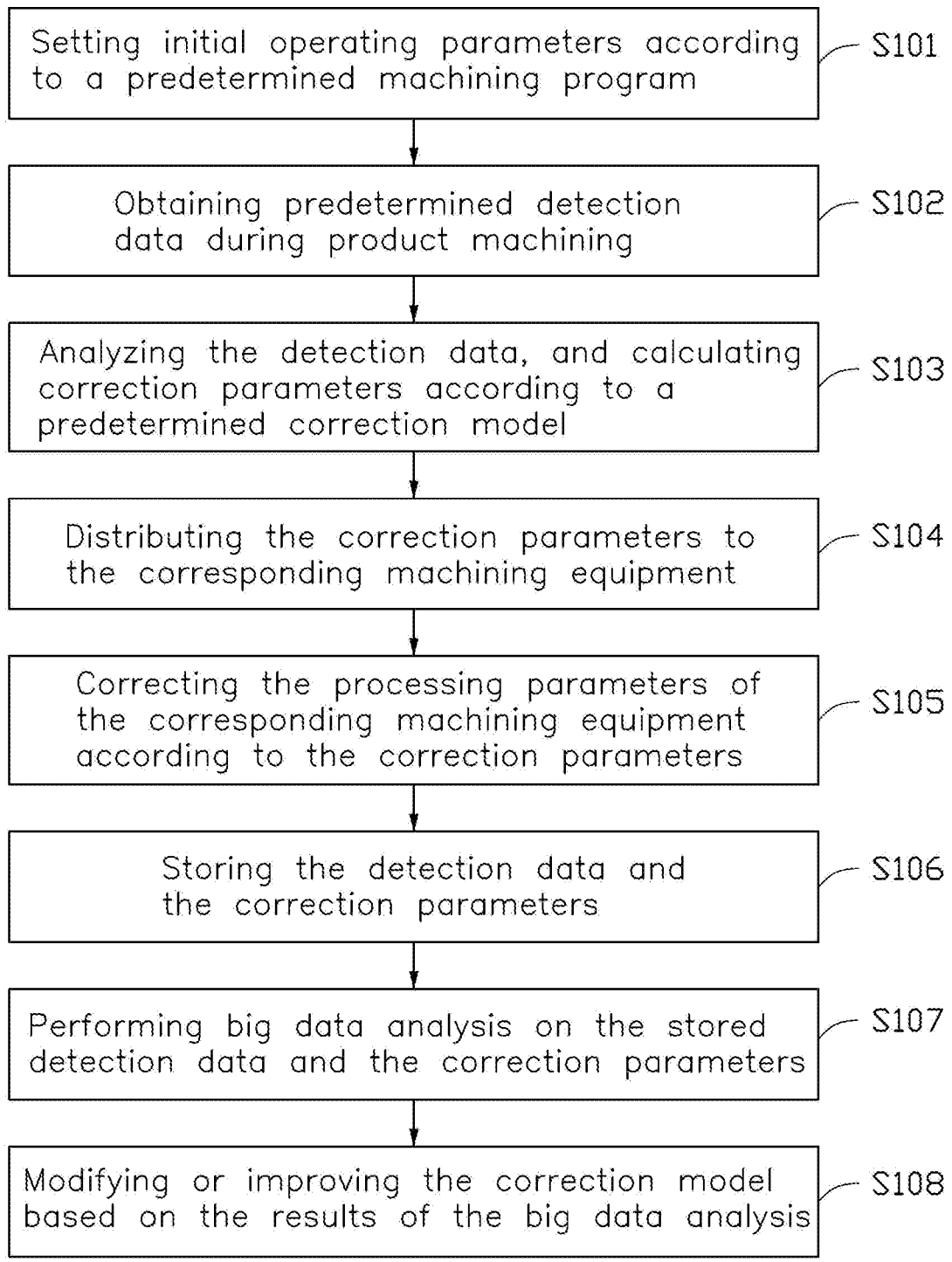
FIG. 2 is a flowchart diagram of a machining apparatus error correction method.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain products may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

FIG. 1 shows an embodiment of a machining apparatus error correction system 500, which includes a processor 200 and a storage medium 100.

A plurality of instructions is stored in the storage medium 100, and the instructions are suitable for being executed by the processor 200 for executing a machining apparatus error correction method applied to a machining apparatus. In one embodiment, the machining apparatus is a digital machining apparatus.

Referring to FIGS. 2-7, the machining apparatus error correction method is implemented in the machining apparatus error correction system 500 and includes the following blocks.

S101: Initial operating parameters are set according to a predetermined machining program. The initial operating parameters include clamping parameters and dimensional inspection standards. The dimensional inspection standards can be standard dimensional inspection parameters of a corresponding dimension.

For example, by using machining apparatus, such as a CNC, for machining a predetermined part, dimensional parameters, form and position tolerance parameters, clamping positions, and dimensional inspection standards of the predetermined part can be set according to the predetermined machining program. The initial operating parameters can facilitate subsequent reference analysis.

Figure 3:
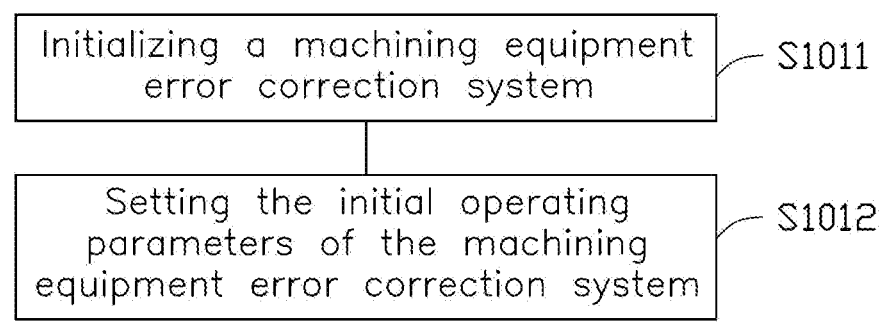
FIG. 3 is a flowchart diagram of a method of setting initial operating parameters according to a predetermined machining program.

In block S101, in one embodiment, a method of setting the initial operating parameters according to the predetermined machining program may specifically include the following blocks, as shown in FIG. 3.

S1011: The machining apparatus error correction system 500 is initialized.

S1012: The initial operating parameters of the machining apparatus error correction system 500 are set. The initial operating parameters can be written into the storage medium 100.

S102: Predetermined detection data is obtained during product machining.

In one embodiment, the predetermined detection data may be a key dimension of a part to be machined. The key dimension can be detected and acquired during machining according to program requirements, and can also be acquired after machining is completed according to program requirements.

Figure 4:
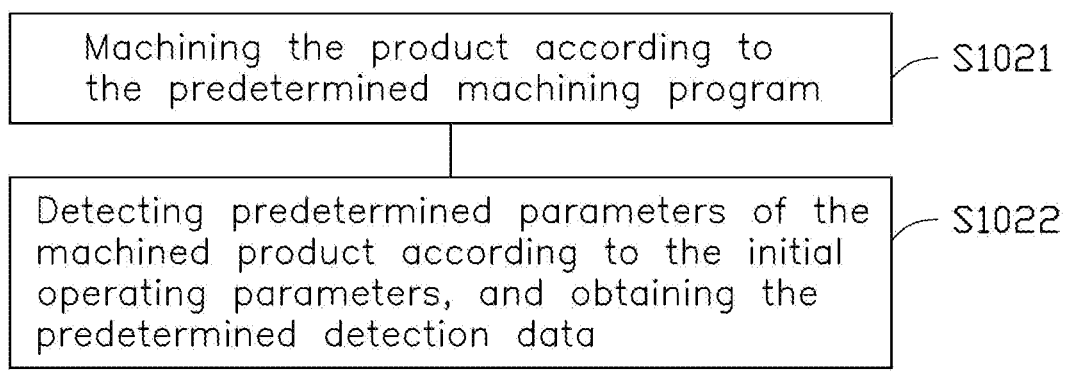
FIG. 4 is a flowchart diagram of a method of obtaining predetermined detection data during machining.

In block S102, in one embodiment, a method of obtaining the predetermined detection data during machining may specifically include the following blocks, as shown in FIG. 4.

S1021: The machining apparatus machines the product according to the predetermined machining program.

S1022: Predetermined parameters of the machined product are detected according to the initial operating parameters, and the predetermined detection data is obtained.

In block S1022, a method of detecting the predetermined parameters of the machined product according to the initial operating parameters may be implemented by means of off-machine detection or manual detection.

According to the requirements of the program, the corresponding parts can be manually submitted for inspection during machining or after machining is completed. For example, the parts to be inspected can be sent to a detector that meets the requirements of inspection accuracy for dimensional inspection, and the acquired inspection data can be transmitted and recorded.

Figure 5:
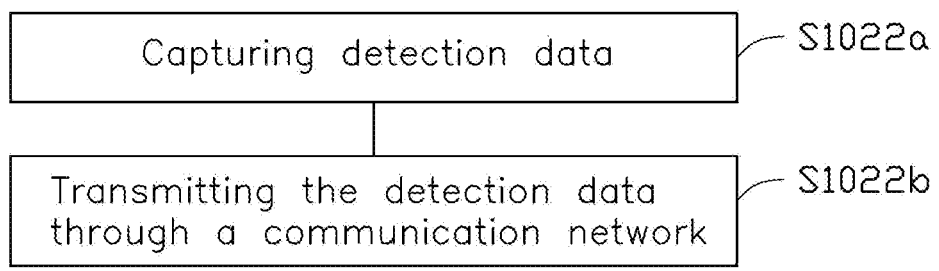
FIG. 5 is a flowchart diagram of a method of detecting the predetermined parameters of the machined product according to the initial operating parameters and obtaining the predetermined detection data.

In block S1022, a method of detecting the predetermined parameters of the machined product according to the initial operating parameters and obtaining the predetermined detection data may specifically include the following blocks, as shown in FIG. 5.

S1022a: Detection data is captured. For example, in one embodiment, the part to be detected may be sent to a detector that meets the requirements of detection accuracy for dimensional detection, and some of the dimensions obtained by detection are key dimensions. Therefore, the key dimensions can be captured from the detected dimensions according to a predetermined rule, which can improve analysis efficiency in a later stage.

S1022b: The detection data is transmitted through a communication network.

S103: The detection data is analyzed, and correction parameters are calculated according to a predetermined correction model.

The correction model may be a correction model established based on artificial intelligence. In actual applications, based on data collection and recording, the correction model can be continuously optimized through manual intervention or machine learning.

Figure 6:
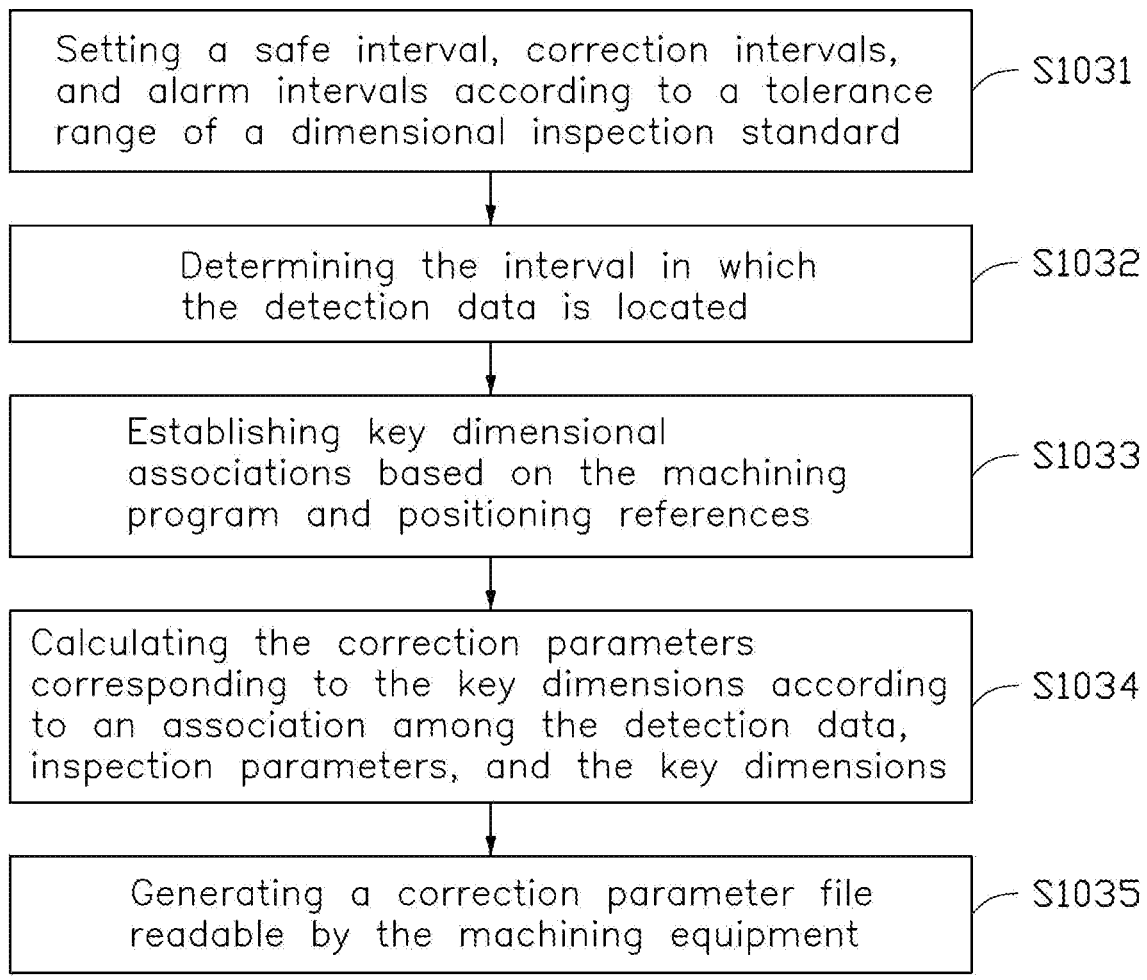
FIG. 6 is a flowchart diagram of a method of analyzing the detection data.
Figure 7:
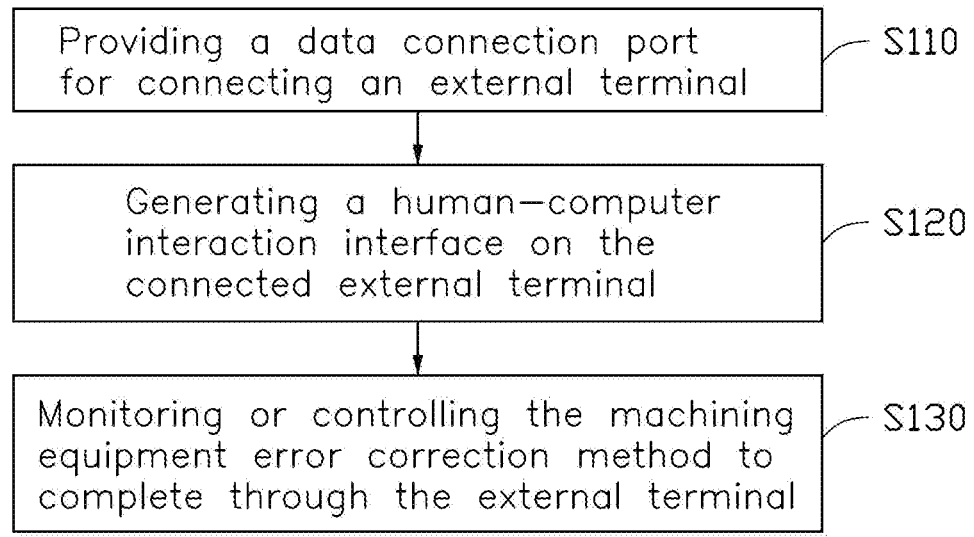
FIG. 7 is a flowchart diagram showing additional blocks of the machining apparatus error correction method.

In one embodiment, a method of analyzing the detection data may specifically include the following blocks, as shown in FIG. 6.

S1031: A safe interval, correction intervals, and alarm intervals are set according to a tolerance range of the dimensional inspection standard.

For example, referring to FIG. 8, in one embodiment, the tolerance range of the dimensional inspection standards is used as a standard interval, then:

The safe interval is set as (50%-150%)*standard interval.

The correction intervals are set as (150%-180%)*standard interval and (20%-50%)*standard interval.

The alarm intervals are set as (180%-Max %)*standard interval and (−50%-Min %)*standard interval.

S1032: The interval in which the detection data is located is determined.

When an error or deviation corresponding to the detection data falls within the safe interval, subsequent blocks are suspended, that is, a machining accuracy of the machining apparatus meets the requirements of the machining program, and no correction is required.

When the error or deviation corresponding to the detection data falls within one of the correction intervals, subsequent blocks are implemented to correct the machining accuracy of the machining apparatus.

When the detection data falls within one of the alarm intervals, the subsequent blocks are suspended, and an alarm is issued. In this case, it is determined that the deviation of the machining accuracy of the machining apparatus is too large and cannot be corrected to the accuracy that meets the machining requirements.

By setting the intervals, the detection data can be pre-processed to prevent subsequent invalid calculations, thereby improving the efficiency of data processing. At the same time, it is convenient to understand the operation status of the machining apparatus in time to prevent the occurrence of machining failures.

In one embodiment, before setting the safe interval, the correction intervals, and the alarm intervals according to the tolerance range of the dimensional inspection standard, the method may further include filtering the detection data according to a predetermined rule and the dimensional inspection standard. A method of filtering the detection data according to a predetermined rule and the dimensional inspection standards may include the following:

Predetermining an ideal value of the detection data according to the dimensional inspection standard;

Determining a screening range according to a floating predetermined ratio of the ideal value;

Filter the obtained detection data according to the screening range;

Calculate a first standard deviation according to the filtered test data;

Calculate a second standard deviation after removing a maximum or minimum value from the filtered detection data;

When the second standard deviation is greater than the first standard deviation, the detection data is unevenly distributed or abnormal, and the detection data is deleted;

When the second standard deviation is less than the first standard deviation, the detection data is retained.

In block S103, in one embodiment, a method of calculating the correction parameters according to the predetermined correction model may specifically include the following blocks, as shown in FIG. 6.

S1033: Key dimensional associations are established based on the machining program and positioning references.

For example, during machining of parts, if there is a relationship between a first dimension and a second dimension, such as if the second dimension is based on the first dimension completed in a previous step, and if the first dimension is corrected, then a tolerance of the second dimension changes accordingly. In the same manner, when multiple dimensions are related to each other, the key dimensional associations need to be established according to the machining procedures and positioning references, so that when one of the dimensions is corrected, the other related dimensions can correspondingly be corrected.

Figure 9:
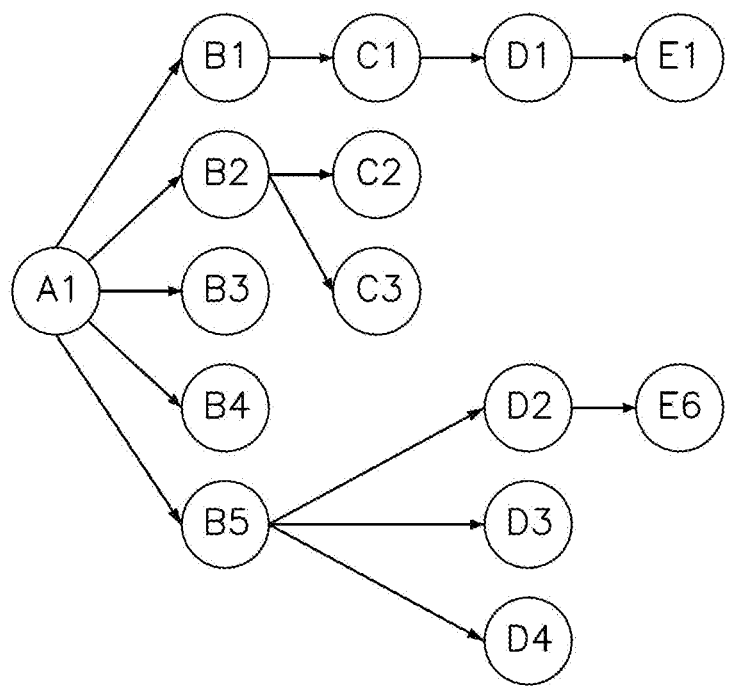
FIG. 9 is a diagram showing a relationship of reference dimensions.

For example, referring to FIG. 9, during machining of a part, a dimension A1 is used as a reference dimension. Dimensions B1, B2, B3, B4, and B5 use the dimension A1 as the reference dimension, dimension C1 uses dimension B1 as a reference dimension, dimensions C2 and C3 use dimension B2 as a reference dimension, dimension D1 uses dimension C1 as a reference dimension, dimensions D2, D3, D4 use dimension B5 as a reference dimension, dimension E1 uses dimension D1 as a reference dimension, and dimension E6 uses dimension D2 as a reference dimension.

Correspondingly, when the dimension A1 is corrected, each of the dimensions B1, B2, B3, B4, B5, C1, C2, C3, D1, D2, D3, D4, E1, and E6 need to be corrected. After dimension B1 is corrected, dimensions C1, D1, and E1 need to be corrected. After dimension B2 is corrected, dimensions C2 and C3 need to be corrected. After dimension B5 is corrected, dimensions D2, D3, and D4 need to be corrected.

That is, after one of the reference dimensions is corrected, the dimensions that used the reference dimension as a reference need to corrected in order to prevent correction of parameters.

Figure 10:
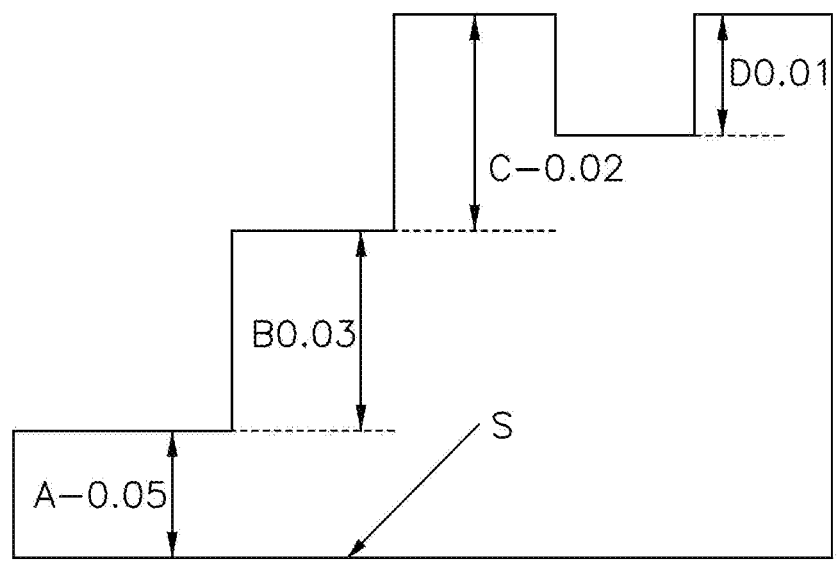
FIG. 10 is a diagram showing a relationship of correction parameters.

Referring to FIG. 10, the dimensional inspection standards of a dimension A is 10, the detection data of dimension A relative to a reference plane S is 10.05, and the corresponding correction parameter is −0.05.

Dimension B uses dimension A as a reference dimension. The dimensional inspection standards for dimension B is 15. The detection data for dimension B is 14.97, so the correction parameter is +0.03. Thus, the correction parameter of dimension B after being associated with dimension A is +0.03+(−0.05)=−0.02.

Dimension C uses dimension B as a reference dimension. The inspection standard for dimension C is 14. The detection data for dimension C is 14.02, so the correction parameter is −0.02. Thus, the correction parameter of dimension C after being associated with dimension B is −0.02+(−0.02)=−0.04.

Dimension D uses dimension C as a reference dimension. The inspection standard for dimension D is 7. The detection data for dimension D is 7.01, so the correction parameter is +0.01. Thus, the correction parameter of dimension D after being associated with dimension C is +0.01+(−0.04)=−0.03.

In addition, when an amount of change, that is, a corresponding correction parameter of a dimension in a subsequent machining process exceeds the tolerance range of the machining process, the correction parameter of the dimension corresponding to a previous machining process can be reversely corrected.

S1034: The correction parameters corresponding to the key dimensions are calculated according to an association among the detection data, inspection parameters, and the key dimensions.

During the machining process, correction of a tool of the machining apparatus includes correction of a height and correction of a rotation diameter. For example, when machining a plane, the height of the tool is usually corrected. When machining a corner of an arc, a yaw diameter of the tool is usually corrected.

For example, a milling tool has a milling diameter of § 10.00 mm. Under ideal conditions, the milling tool rotates about a main axis without yaw. However, in actual use, due to a weight of the milling tool or a degree of stability of clamping the milling tool, rotation of the milling tool will be deflected. For example, rotation of the milling tool is deflected by 0.20 mm, so that an actual milling diameter of the milling tool is § 10.20 mm, which will cause a sidewall or side surface of a product to be machined to be overmilled. Thus, the milling diameter of the milling tool needs to be corrected, such as by retracting a center machining trajectory of the milling tool by 0.20 mm.

In another example, a milling end of the milling tool shrinks due to wear and tear. Thus, in order to ensure the correct machining dimension, the center machining trajectory of the milling tool can be extended to offset the shrinkage caused by wear and tear.

In the above examples, the correction parameter of the milling tool is the amount of retraction or extension of the center machining trajectory. If the correction parameter exceeds a predetermined limit, the machining apparatus error correction system 500 may issue an alarm. For example, if the correction parameter is larger than the arc radius of the corner of the arc to be machined, the machining apparatus error correction system 500 issues an alarm to indicate an abnormality.

In addition, in order for the machining apparatus error correction system 500 to automatically determine whether the tool of the machining apparatus is expanded or retracted relative to the central machining trajectory, and to combine with the above-mentioned alarm to assist in determining the abnormality of the machining apparatus, a judgment parameter may be introduced.

Referring to FIG. 11, an abnormality judgment is performed on a milling tool of a machining apparatus, and the judgment parameter cutting direction*correction direction*correction parameter.

For example, when the machining direction of the milling tool is down milling, the milling direction is assigned a value of 1. When the correction direction is a forward direction, the correction direction is assigned a value of −1. At this time, the correction parameter is a positive value when the center machining trajectory is expanded, and the correction parameter is a negative value when the center machining trajectory is retracted. When the correction direction is a reverse direction, the correction direction is assigned a value of +1. At this time, the correction parameter is a negative value when the center machining trajectory is expanded, and the correction parameter is a positive value when the center machining trajectory is retracted.

For example, when the machining direction of the milling tool is up milling, the milling direction is assigned a value of −1. When the correction direction is a forward direction, the correction direction is assigned a value of −1. At this time, the correction parameter is a negative value when the center machining trajectory is expanded, and the correction parameter is a positive value when the center machining trajectory is retracted. When the correction direction is a reverse direction, the correction direction is assigned a value of +1. At this time, the correction parameter is a positive value when the center machining trajectory is expanded, and the correction parameter is a negative value when the center machining trajectory is retracted.

A method for performing the abnormality judgment of the milling tool according to the judgment parameter includes:

When the judgment parameter is greater than 0, the milling tool is retracted. When the judgment parameter is less than 0, the milling tool is expanded. Then, an alarm rule is set. For example, if the milling tool retracts more than 0.02 mm, the machining apparatus error correction system 500 issues an alarm and re-examines the deviation of the milling tool. If the milling tool retracts more than 0.05 mm, it is determined that the milling tool is severely worn, and the machining apparatus error correction system 500 issues an alarm to prompt replacement of the milling tool.

S1035: A correction parameter file readable by the machining apparatus is generated.

S104: The correction parameters are distributed to the corresponding machining apparatus.

S105: The processing parameters of the corresponding machining apparatus are corrected according to the correction parameters, so that the dimensions of the parts machined by the machining apparatus meet a predetermined accuracy requirement.

Because correction is generated, the above blocks S101-S105 can be repeated to check whether the corrected machining dimensions corresponding to the machining apparatus meet the requirements of the dimensional inspection standards. If the corrected machining dimensions still do not reach the dimensional inspection standards, further corrections are required.

Specifically, after the blocks S101-S105 are performed a first time, dimensional detection data from machining by the digital machining apparatus after correction according to the above-mentioned correction parameter file may be acquired. According to the acquired dimensional detection data and the dimensional inspection standard, the correction parameter of the corresponding dimension is calculated according to the predetermined correction model to generate a correction parameter file readable by the digital machining apparatus. The correction parameter file is distributed to the corresponding digital machining apparatus so that the corresponding digital machining apparatus can once again automatically correct the dimension requiring correction. The blocks are repeated until all of the detection data fully meet the dimensional inspection standards.

Figure 12:
FIG. 12 is a diagram of a correction parameter file.

Referring to FIG. 12, a method of generating the correction parameter file readable by the machining device may include the following.

Addresses corresponding to custom parameters of the machining apparatus are obtained. For example, a CNC device usually includes multiple types of custom parameters, and these custom parameters can be defined and set by a user, so as to control the CNC device.

For example, the CNC device includes the following custom parameters. These custom parameters are used as variables, which are marked with a code and point to a predetermined address:

Local variables: #1-#33.
Global variables: #100-#500.
Macro program variables: #501-#999.
Device system variables: #1000 and above.
G54 machining coordinate system: X: #5221, Y: #5222.
G55 machining coordinate system: X: #5241, Y: #5242.
G56 machining coordinate system: X: #5261, Y: #5262.
P1 additional coordinate system: X: #7001, Y: #7002.
P2 additional coordinate system: X: #7021, Y: #7022.
P3 additional coordinate system: X: #7041, Y: #7042.
H: compensation in the Z direction, D: compensation in the XY direction, marked as:
Length wear variable: H1-H999 #10001-#10999.
Length compensation variable: H1-H999 #11001-#11999.
Radius wear variable: D1-D999 #12001-#12999.
Radius compensation variable: D1-D999 #13001-#13999.

The codes corresponding to the # appended numerical labels can be regarded as the addresses corresponding to the custom parameters of the machining apparatus.

Calculation logic corresponding to the custom parameters is formulated according to the correction model, and the correction parameters obtained according to the calculation logic is directed to an address corresponding to the custom parameter to obtain a correction parameter file including the correction parameter and the corresponding address.

The correction parameter file is in a format readable by the machining apparatus. For example, the correction parameter file includes the code and remark information corresponding to the custom parameters predetermined by the machining apparatus. The custom parameters include local variables for adjusting local machining parameters of the machining apparatus, global variables for adjusting global machining parameters of the machining apparatus, macro program variables for adjusting the correction model, and device system parameters for adjusting the machining apparatus. The code corresponding to each custom parameter is the code preset by the machining apparatus and used as the address corresponding to the custom parameter. The correction parameter obtained through the calculation logic points to the corresponding code, and the machining apparatus can read the corresponding parameter through the code and modify the corresponding machining parameter accordingly.

The remark information is used for remarking the correction parameter file. For example, referring to FIG. 12, column COL1 contains codes for pointing to the foregoing local variable, global variable, macro program variable, or device system variable, and the correction parameter obtained through the calculation logic points to the corresponding code, so that a format that the machining apparatus can read is substituted into the machining apparatus. Column COL2 contains the correction parameters obtained by calculation, and the correction parameters point to the corresponding code in COL1. Column COL3 contains remark information, which can be used to annotate the correction parameters or the standard inspection dimensions corresponding to the correction parameters. The remark information may include multiple groups and serves only for explanation. Using a correction parameter file as an example, the format of the correction parameter file can be O0066 (TIAOJI-P2) (BL), where O0066 is the code, (TIAOJI-P2) is the first remark information, and (BL) is the second remark information.

The correction parameter file is distributed to the corresponding machining apparatus.

The device reads the correction parameter file, obtains the correction parameters, and corrects the machining parameters of the corresponding machining apparatus.

In one embodiment, the machining apparatus error correction method may further include the following blocks.

S106: The detection data and the correction parameters are stored. In one embodiment, the detection data and the correction parameters may be detection data and correction parameters corresponding to the collected multiple machining apparatus and corresponding multiple products.

S107: Big data analysis is performed on the stored detection data and the correction parameters.

S108: The correction model is modified or improved based on the results of the big data analysis, so that the correction model is continuously optimized.

In one embodiment, the machining apparatus error correction method may further include the following blocks.

S110: A data connection port is provided for connecting an external terminal.

S120: A human-computer interaction interface is generated on the connected external terminal.

S130. The machining apparatus error correction method is monitored or controlled to complete through the external terminal.

In a specific implementation, the machining apparatus error correction system 500 can be applied to various scenarios. For example, the machining apparatus error correction system 500 may work in a server application mode and a stand-alone application mode. The following specifically explains the method for correcting the error of the machining apparatus.

When the machining apparatus error correction system 500 works in a server application mode, the machining apparatus error correction system 500 may include a client terminal computer, a correction server, and a data server. At this time, the processing equipment error correction system 500 performs machining parameter correction for a plurality of machining apparatus. The plurality of machining apparatus is connected to each other through an internal network.

Each of the client terminal computer, the correction server, and the data server includes the processor 200 and the storage device 100.

In a specific implementation, the client terminal computer, the correction server, the data server, the external terminal, and the controller of the machining apparatus may communicate with each other based on a TCP/IP protocol.

The client terminal computer is configured to initialize the machining apparatus error correction system 500 and set the initial operating parameters of the machining apparatus error correction system 500. For example, in a specific implementation, the client terminal computer may be a personal computer running WINDOWS system, a browser such as CHROME or FIREFOX, or an application developed on a .NET platform.

The client terminal computer can be used to import standard inspection specifications, import the dimensional inspection standards, set machine information of the machining apparatus, set the clamping parameters of the product to be machined, issue correction calculation commands to a correction calculation server, check a progress of the correction calculation, check a distribution status of the correction parameters, and other functions.

The correction server can run WINDOWS system. A plurality of instructions is stored in the correction server in advance. For example, a data analysis module, an arc corner module, an associated size module, a data filtering module, a correction interval module, and a correction control module are stored in the correction calculation server in advance, and each module corresponds to a set of instructions for executing a predetermined function. The correction operation server may call corresponding instructions through JDK+Tomcat+FocasAPI, etc., to implement corresponding functions.

The data server may be a MySQL database server running WINDOWS or LINUX system.

At the same time, the client terminal computer can be used to provide a data connection port to connect an external terminal, such as a computer or a mobile terminal such as a mobile phone or tablet computer, to perform human-computer interaction through the external terminal, for example, to view changes in correction parameters, view the effects of correction, or manual control correction.

The parts to be detected can be sent to a detector that meets the requirements of detection accuracy for dimensional detection. Some of the dimensions obtained by inspection are key dimensions. The machining apparatus error correction system 500 captures key dimensions from the detected dimensions according to a predetermined rule and transmits them to the correction server through a network interface or a wireless network.

The correction server analyzes the detection data. For example, when the error or deviation corresponding to the detection data falls within the safe interval, the correction server suspends the execution of the subsequent blocks, that is, the machining accuracy of the equipment meets the requirements of the program, and no correction is required, so the execution of the subsequent correction steps may be suspended. When the detection data falls within one of the alarm intervals, the subsequent blocks are suspended, and an alarm is issued. In this case, it is determined that the deviation of the machining accuracy of the machining apparatus is too large and cannot be corrected to the accuracy that meets the machining requirements. When the error or deviation corresponding to the detection data falls within one of the correction intervals, correction calculation is performed according to a predetermined correction model, a correction parameter file is generated, and data backup is performed.

The correction parameter file is transmitted to the machining apparatus through the communication connection. In a specific implementation, the correction parameter file may be distributed to multiple machining apparatus at the same time. After the machining apparatus corrects the machining parameters according to the correction parameter file, the machining apparatus machines the next product. The data server acquires and stores the aforementioned detection data, correction parameter files, and machining parameters after correction by multiple devices, and stores the data through a communication connection. At the same time, big data analysis is performed on the stored data, and based on the results of the big data analysis, the correction model is corrected or improved, so that the correction model is continuously optimized.

In addition, the data server can also analyze the correction of the same dimension of multiple devices to analyze the differences in machining apparatus caused by the environmental impact of different machines. At the same time, engineering stability analysis can also be performed on multiple dimensions of a single machine.

When the machining apparatus error correction system 500 works in a stand-alone application mode, it can also be applied in various scenarios.

In one scenario, the machining apparatus error correction system 500 is run on a desktop computer or a laptop computer, and the data storage is also run on the desktop computer or laptop computer. Specifically, the processor 200 of the machining apparatus error correction system 500 may be a processor of a desktop computer or a notebook computer, and the storage medium 100 corresponds to a storage unit of the desktop computer or a notebook computer, such as a hard disk.

The plurality of instructions is stored in a storage unit of the desktop computer or a notebook computer, and the instructions are adapted to be loaded by a processor of the desktop computer or a notebook computer to execute a machining apparatus error correction method.

In this scenario, the machining apparatus error correction method is the same as in the server application mode, except that the desktop computer or notebook computer integrates the functions of the system server, correction server, and data server.

In addition, when multiple processing devices have been networked, the computer accesses the local area network and distributes correction parameters to each corresponding processing device. When multiple machining apparatus are not networked, the computer is connected to each machining apparatus one by one through a network cable and transmits correction parameters to the machining apparatus.

The desktop computer or notebook computer starts a Web service, and uses convenient hardware such as portable WiFi to build a WiFi environment. The mobile terminal connects to this WiFi and accesses the Web service, controls the correction software, or checks the real-time data.

This scenario has low hardware requirements, does not require additional servers, and is suitable for small factories.

In another scenario, the machining apparatus error correction system 500 is run in a black box, and data storage is also run in the black box. For example, a black box is a small computer that runs WINDOWS.

Specifically, the processor 200 of the machining apparatus error correction system 500 may be a black box processor, and the storage medium 100 corresponds to a black box storage unit, such as a hard disk.

The software in the black box must be bound to hardware (such as CPUID, network card ID), or use other schemes to prevent the software in it from being stolen.

When using the black box, a client computer is required, for example, the client computer is connected through a network cable, or the display is connected to the black box. After the initial operating parameters and test data are imported, the correction parameters are calculated by the black box and sent to the machining apparatus connected to it. The results of the correction calculation and the process of sending to the machining apparatus can be seen directly from the client computer or display, allowing users to use it with confidence.

The black box can be equipped with WiFi functions and Web services for easy access by mobile terminals. The black box comes with a power and battery indicator.

In another scenario, the black box has only one network port and cannot connect client computers and machining apparatus at the same time. When in use, the client computer or display is first connected to the black box, then the detection data is written to the black box to perform the correction calculation. Then, the black box is connected to a processing device, a predetermined button is pressed on the black box, the command to write the correction parameters to the processing device is triggered, and an indicator on the black box indicates whether the writing was successful.

In addition, the time-consuming algorithms of the method can be executed on a PC client to reduce hardware configuration requirements of the black box.

In the above-mentioned machining apparatus error correction method and machining apparatus error correction system 500, initial operating parameters such as clamping parameters and dimensional inspection standards are set according to a predetermined machining program. After obtaining predetermined detection data during product machining, the detection data is analyzed, correction parameters are calculated by the predetermined correction model, and the correction parameters are distributed to the corresponding machining apparatus. Correcting the machining parameters of the corresponding machining apparatus according to the correction parameters can reduce the time and manpower required to adjust the machining apparatus and speed up the adjustment efficiency.

Specifically, the above-mentioned machining apparatus error correction method and machining apparatus error correction system 500 have the following significant improvements.

First, cost reduction.

1. It can realize the machining performance of old equipment, and can produce high-precision products under proper maintenance.

2. The equipment can debug the product machining accuracy in place within a few materials, reducing cost and waste.

3. The system assists tuning personnel, greatly reducing the difficulty of tuning, reducing the time and manpower required for tuning, and speeding up the tuning efficiency.

Second, quality optimization.

1. For the products to be machined, the first and last pieces are tested once a day, and the tool is tested once after being replaced, so that the inspection frequency can be reduced.

2. Based on key dimensions, a logical relationship can be established to reduce measurement points.

Third, intelligent auxiliary decision-making.

1. According to product machining results and historical correction data, a status of the machining tool or of the machining apparatus can be analyzed to realize real-time maintenance and preventive warranty.

2. Through the results of system analysis, personnel are quickly assisted to troubleshoot problems.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, dimension and arrangement of the products within the principles of the present disclosure up to, and including, the full extent established by the broad general meaning of the terms used in the claims.

What is claimed is:

1. A machining apparatus error correction method implemented in a machining apparatus error correction system, the method comprising:
    setting initial operating parameters according to a predetermined machining program, the initial operating parameters comprising clamping parameters and dimensional inspection standards;
    obtaining predetermined detection data during machining of a product;
    analyzing the predetermined detection data, and calculating a correction parameter according to a predetermined correction model, the step of analyzing the predetermined detection data comprising:
        filtering the predetermined detection data according to a predetermined rule and the dimensional inspection standards; and
        determining a standard interval according to a tolerance range of the dimensional inspection standards, and setting intervals according to the standard interval, the intervals comprising a safe interval, a correction interval, and an alarm interval; the safe interval is within the correction interval, and the correction interval is within the alarm interval;
    determining the interval in which the predetermined detection data are located, wherein if the predetermined detection data are located within the safe interval, no calculating a correction parameter is provided, and if the predetermined detection data are located within the alarm interval, an alarm is issued;
    distributing a correction parameter file to a corresponding machining apparatus if the predetermined detection data are located within the correction interval; and
    correcting a machining parameter of the corresponding machining apparatus according to the correction parameter;
    wherein the step of filtering the detection data according to a predetermined rule and the dimensional inspection standards comprises:
    predetermining an ideal value of the predetermined detection data according to the dimensional inspection standards;
    determining a screening range according to a floating predetermined ratio of the ideal value;
    filtering the obtained detection data according to the screening range;
    calculating a first standard deviation according to the filtered detection data; and
    calculating a second standard deviation after removing a maximum or minimum value from the filtered detection data; wherein:

when the second standard deviation is greater than the first standard deviation, the detection data are unevenly distributed or abnormal, and the detection data are deleted; and when the second standard deviation is less than the first standard deviation, the detection data are retained.

2. The machining apparatus error correction method of claim 1, wherein the step of obtaining the predetermined detection data during machining of the product comprises:
machining the product according to the predetermined machining program; and
detecting predetermined parameters of a machined product according to the initial operating parameters to obtain the predetermined detection data.

3. The machining apparatus error correction method of claim 2, wherein the step of detecting the predetermined parameters of the machined product according to the initial operating parameters is implemented by means of off-machine detection or manual detection.

4. The machining apparatus error correction method of claim 1, wherein before analyzing the predetermined detection data, the method further comprises:
capturing the predetermined detection data; and
transmitting the predetermined detection data through a communication network.

5. The machining apparatus error correction method of claim 1, wherein the step of calculating the correction parameters according to the predetermined correction model comprises:
establishing key dimensional associations based on machining procedures and positioning references;
calculating the correction parameter corresponding to key dimensions according to an association among the predetermined detection data, inspection parameters, and the key dimensions; and
generating a correction parameter file readable by the machining apparatus.

6. The machining apparatus error correction method of claim 5, further comprising:
storing the predetermined detection data and the correction parameters;
performing big data analysis on the stored detection data and the correction parameters; and
adjust the predetermined correction model based on results of the big data analysis.

7. The machining apparatus error correction method of claim 1, further comprising:
providing a data connection port; wherein the data connection port connects to an external terminal;
generating a human-computer interaction interface on the external terminal; and
monitoring the machining apparatus error correction method through the external terminal.

8. A machining apparatus error correction system comprising:
a processor; and
a storage medium storing a plurality of instructions, which when executed by the processor, cause the processor to:
set initial operating parameters according to a predetermined machining program, the initial operating parameters comprising clamping parameters and dimensional inspection standards;
obtain predetermined detection data during machining of a product;
analyze the predetermined detection data, and calculate a correction parameter according to a predetermined correction model, the step of analyzing the predetermined detection data comprising:
filtering the predetermined detection data according to a predetermined rule and the dimensional inspection standards; and
determining a standard interval according to a tolerance range of the dimensional inspection standards, and setting intervals according to the standard interval, the intervals comprising a safe interval, a correction interval, and an alarm interval; the safe interval is within the correction interval, and the correction interval is within the alarm interval;
determine the interval in which the predetermined detection data are located, wherein if the predetermined detection data are located within the safe interval, no calculating a correction parameter is provided, and if the predetermined detection data are located within the alarm interval, an alarm is issued;
distribute a correction parameter file to a corresponding machining apparatus if the predetermined detection data are located within the correction interval, the method continues; and
correct a machining parameter of the corresponding machining apparatus according to the correction parameter;
wherein the processor:
filters the detection data according to a predetermined rule and the dimensional inspection standards by:
predetermining an ideal value of the predetermined detection data according to the dimensional inspection standards;
determining a screening range according to a floating predetermined ratio of the ideal value;
filtering the obtained detection data according to the screening range;
calculating a first standard deviation according to the filtered detection data; and
calculating a second standard deviation after removing a maximum or minimum value from the filtered detection data; wherein:
when the second standard deviation is greater than the first standard deviation, the detection data are unevenly distributed or abnormal, and the detection data are deleted; and
when the second standard deviation is less than the first standard deviation, the detection data are retained.

9. The machining apparatus error correction system of claim 8, wherein the processor obtains the predetermined detection data during machining of the product by:
machining the product according to the predetermined machining program; and
detecting predetermined parameters of a machined product according to the initial operating parameters to obtain the predetermined detection data.

10. The machining apparatus error correction system of claim 9, wherein the step of detecting the predetermined parameters of the machined product according to the initial operating parameters is implemented by means of off-machine detection or manual detection.

11. The machining apparatus error correction system of claim 8 wherein before the processor analyzes the detection data, the processor is further configured to:
capture the predetermined detection data; and
transmit the predetermined detection data through a communication network.

12. The machining apparatus error correction system of claim 8, wherein the processor calculates the correction parameters according to the predetermined correction model by:
- establishing key dimensional associations based on machining procedures and positioning references;
- calculating the correction parameter corresponding to key dimensions according to an association among the predetermined detection data, inspection parameters, and the key dimensions; and
- generating a correction parameter file readable by the machining apparatus.

13. The machining apparatus error correction system of claim 12, wherein the processor is further configured to:
- store the predetermined detection data and the correction parameters;
- perform big data analysis on the stored detection data and the correction parameters; and
- adjust the predetermined correction model based on results of the big data analysis.

14. The machining apparatus error correction system of claim 8, wherein the processor is further configured to:
- generate a human-computer interaction interface on an external terminal connected to the machining apparatus error correction system.

\* \* \* \* \*